Jan. 5, 1965 M. E. ANDERSON 3,164,682

MAGNETIC TRANSDUCER

Filed Aug. 20, 1959 2 Sheets-Sheet 1

CHARACTERISTICS OF THE RECORDING MEDIA SHOWING EFFECTS OF APPLIED BIAS

INVENTOR.
MARVIN E. ANDERSON
BY
Hill, Sherman, Meroni, Gross & Simpson
Attys.

Jan. 5, 1965 M. E. ANDERSON 3,164,682

MAGNETIC TRANSDUCER

Filed Aug. 20, 1959 2 Sheets-Sheet 2

INVENTOR.
MARVIN E. ANDERSON
BY
Hill, Sherman, Meroni, Gross & Simpson
Attys.

United States Patent Office 3,164,682

Patented Jan. 5, 1965

3,164,682
MAGNETIC TRANSDUCER

Marvin E. Anderson, Chicago, Ill., assignor to IIT Research Institute, a corporation of Illinois Filed Aug. 20, 1959, Ser. No. 834,977
13 Claims. (Cl. 179—100.2)

This invention relates to magnetic recording, and more particularly to an improved multichannel prealigned integral recording head.

In accordance with the invention, a novel apparatus is provided for magnetic recording of an electric signal current of varying magnitude enabling the recording of much higher frequencies than heretofore possible by the prior art.

My invention makes use of a transverse recording on a record medium, realizing thereby a system capable of recording signal currents of vastly greater frequency range than possible with longitudinal recording systems now in use. By transverse recording as used herein is meant the magnetizing of a record medium moving over a magnetizing head having portions of a signal to be recorded distributed transversely thereon. That is to say, each individual recording head records in the longitudinal mode, however, the signal is distributed transversely by a multiplicity of recording heads. Transverse recording is not novel; on the other hand, such recording as used herein in conjunction with my apparatus represents considerable improvement over the prior art.

In addition, my novel method of recording is an improvement over the prior art. Briefly, such method consists of applying a signal to be recorded to a signal winding and not recording the signal until such time when a bias pulse is applied to the bias winding whereby the system then operates in the linear portion of the record medium characteristic. In this manner, I successively switch, or scan, the signal over a multiplicity of recording heads and record in sections transversely on the record.

Accordingly, an object of the instant invention is the provision of a magnetic transducer of improved construction and performance for multichannel or transverse recording.

Another object of the present invention is to provide a novel multichannel high frequency magnetic transducer embodying the principle of a common pole piece and realizing much greater packing density thereby. That is, for a given tape width my invention affords a considerably greater number of recording channels thereon.

Yet another object of the instant invention is to provide a novel multichannel high frequency magnetic transducer embodying the principle of a common pole piece wherein frequencies higher than heretofore possible are recordable intelligibly.

Still another object of the present invention is to provide a novel multichannel magnetic recording head embodying the principle of the common pole piece wherein recording is obtained by a novel bias pulsing arrangement.

A further object of the instant invention is to improve the technique of multichannel magnetic recording by the provision of my novel signal-scanning recording method.

Still a further object of the instant invention is to provide a novel multichannel magnetic transducer embodying the principle of the common pole piece to record a multiplicity of signals simultaneously on a single record medium.

Some of my objects are accomplished by forming three core structures out of a magnetic material such as ferrite, mumetal, Hy-mu 80, or the like. One core structure forming the common pole piece and the other cores, on opposite sides of the common pole piece, defining a plurality of magnetic recording channels in staggered relationship with respect to each other.

For a better understanding of the invention the reader's attention is directed to the following detailed description read in connection with the accompanying drawings. In which.

In approaching the problem of higher frequency recording the three parameters which affect such frequency namely, gap width, tape speed and number of channels, lead one to realize that the number of channels is the most logical parameter to vary. This is especially true since tape velocities are standardized and the gap widths are infinitesimal with the present state of the art. Also higher tape speeds would result in greater head wear as well as requiring the use of larger reels of tape. Accordingly, my improved novel construction solves the problem of frequency limit by providing, more efficiently, a greater number of recording channels for a given tape width.

Before proceeding to a detailed description of the embodiments of my invention the novel concepts underlying my invention, hereinafter to be described in detail, should be considered. As is well known to those versed in the art of magnetic recording the upper frequency limit is directly proportional to the velocity of the tape and inversely proportional to the gap width. However in multichannel multiplexing operation the frequency limit is governed by the ratio of the tape velocity to the wave length multiplied by the number of channels.

Expressed in methematical form:

$$F=\frac{V}{\lambda}\times\frac{N}{2} \qquad (1)$$

where F is the frequency; V is the tape velocity; λ is the wave length; and N is the number of channels employed. The gap width is critical in that when the wavelength (upper frequency limit) recorded equals the dimension of the gap width the amplitude of the recorded signal is substantially zero. Accordingly, in calculating the upper frequency limit Equation 1 is generally reduced by a factor of ½ thereby insuring a recorded signal of sufficient amplitude. That is to say, if said limit were solely determined by Equation 1 many of the higher frequency signals would for all practical purposes not be recorded.

For example, in one particular embodiment I constructed a 36 channel transducer having gap widths of 0.0005 in. and employed a tape velocity of 30 in. per second. My calculated practical frequency limit was:

$$\begin{aligned} F&=\frac{V}{\lambda(2)}\times\frac{N}{2}\\ &=\frac{30}{(.0005)(2)}\times\frac{36}{2}\\ &=540{,}000 \text{ c.p.s. or .54 megacycle} \end{aligned} \qquad (2)$$

It is noted that if Equation 1 were used in the calculation the limit would be 1.08 megacycles. However, as before described, a portion of the signals form .54–1.08 megacycles would be unreproducible.

Figures 1, 2:
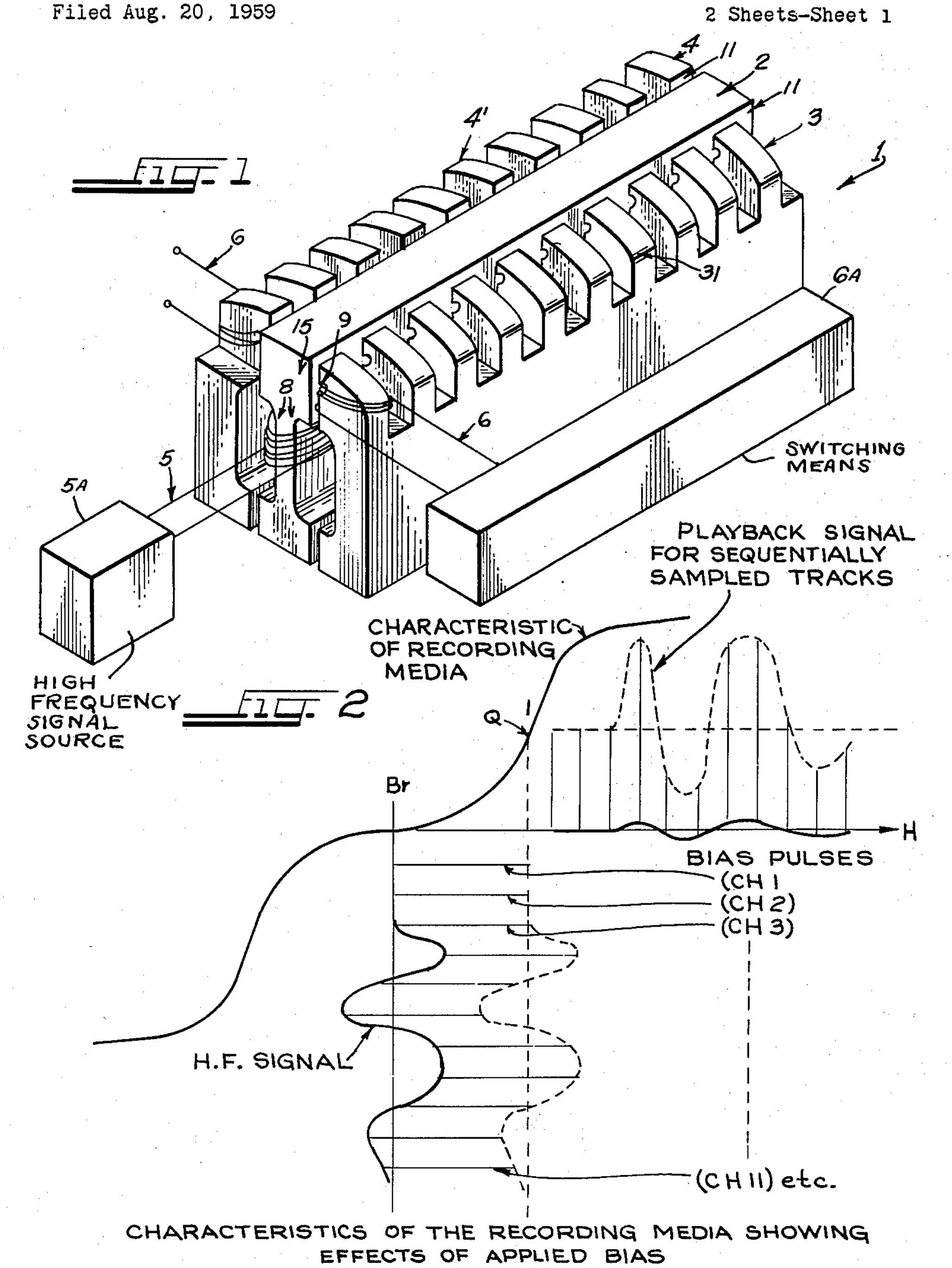
FIGURE 1 is a perspective view of a recording head embodying my invention.
FIGURE 2 depicts the characteristics of the recording media and its effects on the principles embodied in my invention.

Referring to the drawings in more particularity, FIGURE 1 shows a high frequency multichannel transducer generally designated by the numeral 1. The transducer comprises three core sections, 2, 3, and 4. The core sections are all made of a magnetic material which may be, for example, ferrite, mumetal, Hy-mu 80, or the like. These materials exhibit similar magnetic properties as is known to those skilled in the art. Ferrite is a homogeneous crystalline material composed of ferric-oxide and an oxide of another metal and Hy-mu 80 and mumetal are alloys composed of 79 percent Ni, 17 percent Fe and 14 percent Mo. The section 2 comprises the common pole piece and extends laterally along the entire width of the head. The common pole piece 2 has accurately machined and highly polished upper surfaces. The pole piece 2 also has annular grooves 8 at the midsection thereof adapted to receive a signal winding 5. Core structure 3 is also a magnetic material, however, it has a plurality of spaced upwardly extending, parallel, equidistant slots along the lateral extent of the upper portion thereof. The upwardly extending legs 3' defined by said slots each have an annular groove 9 adapted to receive a bias winding 6. Core structure 4 is identical to core 3 with the exception that its upwardly extending legs 4' are displaced one slot width with reference to core 3 such that when cores 3 and 4 abut the common pole piece 2 on opposite sides thereof, the magnetic recording gaps defined by the legs of cores 3 and 4 are in a precise staggered relationship with respect to each other. As an illustration, if the pole pieces 3 and 4 were butted, with their lateral edges in the same planes, their legs 3' and 4' would precisely interleave as for example like pressing two combs together.

The pieces 3 and 4 are butted to the common pole piece 2 on opposite sides thereof such that the bottom portions of the sections are maintained in intimate magnetic contract. The legs 3' and 4' of the cores 3 and 4, on the other hand, are precisely displaced from the common pole piece 2 defining a fine gap 11 on opposite sides of the upper portion of the common pole piece 2.

In FIGURE 2 I have shown the characteristic of a recording media and the manner of recording thereon in accordance with the principles of my invention. The solid lined sinusoids in the figure represent the high frequency signal, from signal source 5A, applied to the common pole winding 5 and the remanent magnetization produced thereby in the absence of bias. The dotted lined sinusoids, on the other hand represent the algebraic summation of the high frequency signal and bias pulses, and the remanent magnetization produced thereby. The bias pulses being applied to the windings 6 on the individual recording legs 3' and 4'. If no bias were applied to the individual channels via windings 6 the magnetization of the record medium would for all practical purposes be insignificant as shown by the projected solid sinusoid. However, when bias is applied to the windings 6, in sequence, the quiescent point would now be in the mid range of the linear portion of the record medium characteristic. Consequently, the amplitude variations of the high frequency signal applied to winding 5 are faithfully recorded.

The circuitry of switching means 6A required to sequentially apply the bias to the individual windings 6 form no part of the instant invention. That is, many equally suitable arrangements for sequentially applying such bias may be employed within the purview of skilled artisans. For example, gate circuits for each individual winding 6 operative such that a bias pulse would be applied to the individual 6 operative such that a bias pulse would be applied to the individual windings 6 in a predetermined sequence may be used. In this respect I have employed gating circuits in a 36 channel embodiment of my invention wherein the bias pulses were of 0.2 microsecond duration at a tape width sweep rate of 10 kilocycles. Thus, scanning or sweeping the intelligence to be recorded across the head. This results in limited-duty-cycle operation. With 0.2 microsecond bias pulses and a 10 kc. sweep rate 500 channels would be required to attain continuous duty cycle operation.

One type of switching system suitable for inclusion in means 6A is shown in Patent Number 2,698,875 issued to J. H. Greenwood. This system employs several tetrodes as gates to selectively apply voltage to recording heads extending laterally across a record medium. In operation, these tubes, normally cut off, are rendered operational by pulses applied to the screen grids (from an impulse generator). Thus, a signal on the control grids is applied to the windings 6 which would be connected to the plates of the tetrodes. In applicant's case this signal would be the bias signal and its magnitude after amplification would be sufficient to reach the "Q" point (see FIG. 2) of the record medium characteristic. In this way, the bias pulses, successively applied, cause the record signal to be distributed across the heads and thus to the record medium.

Figure 3:
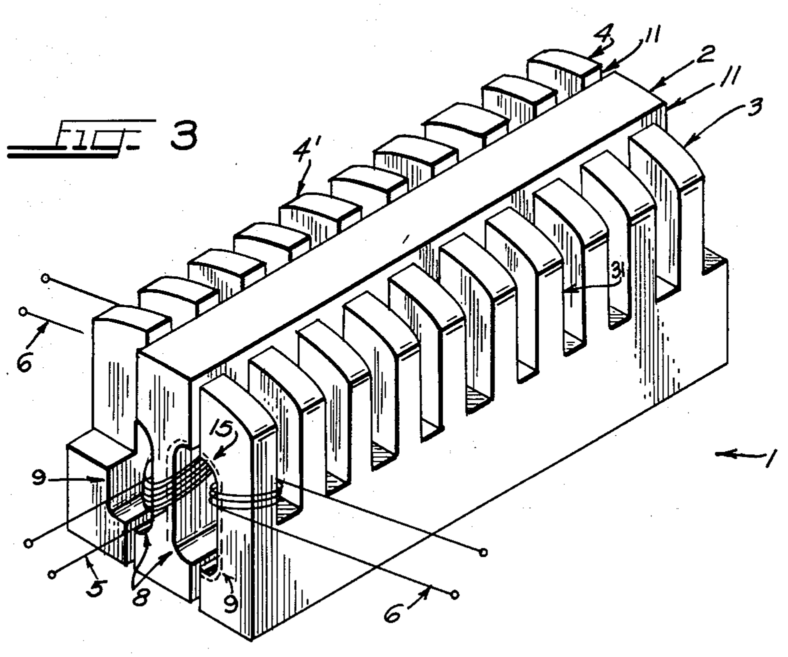
FIGURE 3 is a perspective view of the preferred embodiment of my invention.
Figure 4:
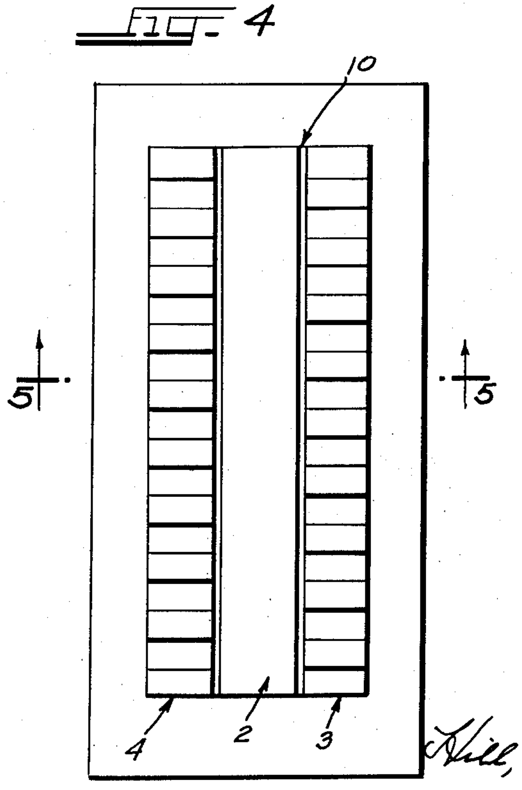
FIGURE 4 is a plan view of the preferred embodiment of my invention encased in a suitable potting material.
Figure 5:
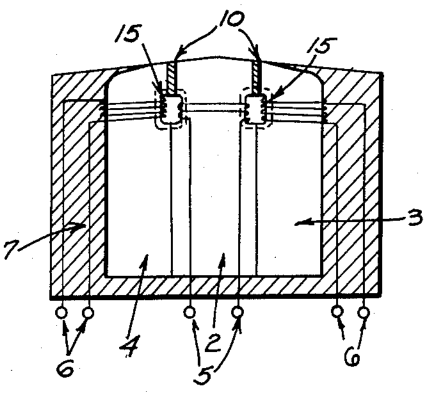
FIGURE 5 is a sectional view of the preferred embodiment taken along the lines 5—5 of FIGURE 4.

The description of the preferred embodiment of my invention should be considered in conjunction with FIGURES 3, 4 and 5. This preferred embodiment of the transducer 1 embodies the same concepts disclosed with reference to FIGURE 1, however, this embodiment is more efficient in that losses occasioned by the air gaps in the magnetic circuit are minimized. This minimization is effected by displacing the annular grooves 9 from the faces of the individual pole legs 3' and 4'. In consequence thereof the magnetic path 15 no longer traverses two air gaps. Another result thereof, is that the actual size of the pole face is shortened and more efficiently employed.

FIGURE 4 depicts a plan view of my transducer encased in a suitable potting material 7. The gaps between the common pole 2 and the individual legs 3' and 4' of core structures 3 and 4 can be filled by suitable spacers to insure constant gap widths. In this embodiment copper shims 10 were used, however, any suitable non-magnetic conducting material may be used.

In another embodiment the common pole winding 5 is eliminated and a continuous conductive gap spacer is substituted therefor. For example, the copper shim 10 (FIGS. 4 and 5) would define a single conductive loop around the periphery of the common pole piece 2. The high frequency signal would then be applied to the loop. Likewise the individual bias windings are replaced by an insulated, conducting gap spacer. In this case the signal and bias windings are eliminated and the gaps would contain two spacers, with insulation therebetween, functioning as signal and bias windings respectively. Such insulation may be "Teflon" or the like. The gap spacers acting as bias windings would individually encircle, on three sides thereof, their respective pole legs 3' and 4'. This embodiment eliminates the lower portion of the transducer thereby making the structure physically and magnetically more efficient.

Various modifications of that hereinabove described are of course permissible. In some instances it may be desirable to record a plurality of signals on individual channels along the lateral extent of the tape. In such instance the individual signals would be applied to the windings 6 on the individual legs 3' and 4' and the bias, A.C. or D.C. would be applied to the winding 5 on the common pole piece 2. Also my transducer may be employed for stereophonic or multiplex recording. In such case, so many channels (windings 6) would be employed to record the sound emanating from the "left" and the remaining channels (windings 6) would record that sound from the "right."

In another modification for multi-signal multiplex recording a carrier frequency is applied to the signal winding 5 and low frequency signals to windings 6. In this manner, operating at the knee of the characteristic (see FIG. 2) the low frequency signals amplitude-modulate the carrier. The signals applied to windings 6 may vary from D.C. to some frequency governed by the carrier frequency applied to the common pole winding 5. The relationship between carrier and modulator frequency is approximately one cycle of intelligence per ten cycles of carrier. In this manner, acceptable amplitude modulation is insured.

It is noted that the above modifications, as well as others which will occur to those experienced in this field, do not depart from the spirit and scope of my invention namely; a multichannel magnetic transducer affording greatly increased packing density accomplished by an improved structure and novel recording method.

In accordance with my invention a 1,000 channel magnetic transducer is readily feasible for a 2 inch record medium. In this case, the common pole piece 2 would extend across the entire width of the medium. The pole pieces 3′ and 4′ would each contain 500 upwardly extending legs 3′ and 4′ defining 1,000 single recording channels. The legs 3′ and 4′ would be a fraction less than 0.002 in. in width and are spaced apart 0.004 in. center to center. The legs are laterally offset 0.002 in. on opposite sides of the common pole piece in face to face relation. The practical upper frequency limit with a 0.0005 in. gap width and a tape velocity of 30 in. per second would be 15 megacycles.

The foregoing detailed description has been given for clearness of understanding and no unnecessary limitations should be understood therefrom.

I claim as my invention:

1. A multichannel high frequency magnetic head assembly comprising: first, second and third magnetic core structures, said first core structure comprising a member having upper and lower portions, the lower portion of said first core structure defining a solid continuous body of magnetic material, the upper portion of said first core structure defining a plurality of spaced members of magnetic material integral with said first lower core portion, an individual bias winding separately wound on each of the spaced members of the upper portion of said first core structure, said second core structure defining a solid body of magnetic material having continuous upper and lower surfaces, a signal translating coil wound on said second core, said third core structure comprising a member having upper and lower portions, the lower portion of third core structure defining a solid continuous body of magnetic material, the upper portion of said third core structure defining a plurality of spaced members of magnetic material integral with said third core lower portion, an individual bias winding wound on each of said third core upper portions, the lower surfaces of said second core structure abutting effectively magnetically contacting a lower portion of the first and third core sturctures respectively on opposite sides thereof, the upper portions of said first and third core structures being respectively spaced on opposite upper surfaces of the second core structure thereby defining individual signal translating gaps therewith, means for applying a high frequency signal to the second core structure coil, and means for predeterminately sequentially applying recording bias to the individual bias windings on the upper portions of the first and third core structures.

2. A multichannel magnetic head assembly comprising: first, second and third magnetic core structures, said first core structure comprising a member having upper and lower portions, the lower portion of said first core structure defining a solid continuous body of magnetic material, the upper portion of said first core structure defining a plurality of spaced members of magnetic material integral with said first lower core portion, an individual bias coil wound on each of the spaced members of the upper portion of said first core structure, said second core structure defining a solid body of magnetic material having continuous upper and lower surfaces, a signal translating coil wound on said second core member, said third core structure comprising a member having upper and lower portions, the lower portion of third core structure defining a solid continuous body of magnetic material, the upper portion of said third core structure defining a plurality of spaced members of magnetic material integral with said third core lower portion, an individual bias coil wound on each of said third core upper portions, the lower surfaces of said second core structure abutting effectively magnetically contacting a lower portion of the first and third core structures respectively on opposite sides thereof, the upper portions of said first and third core structures being respectively spaced on opposite upper surfaces of the second core structure thereby defining individual signal translating gaps therewith, means for applying a high frequency signal to said signal translating coil of an amplitude whereby the high frequency signal is not normally recorded, and means for predeterminately sequentially applying recording bias to the individual windings on the upper portions of the first and third core structures to effect recording of said signal.

3. A multichannel high frequency head assembly comprising a common pole piece, a signal winding wound on said common pole, a first pole piece having a plurality of parallel legs extending upwardly therefrom abutting one side out of the common pole piece such that fine gaps are defined between the legs and the common pole piece, a second pole piece having a plurality of parallel legs upwardly extending therefrom abutting the opposite side of the common pole piece such that fine gaps in a staggered relationship with respect to the first pole piece are defined between the legs of the first and second pole pieces and the common pole, and an individual bias winding wound on each of the legs of said first and second pole pieces.

4. In a multichannel high frequency head assembly for use with a magnetic record medium means having a magnetic transfer characteristic with a substantially linear portion comprising: a common pole piece, a signal winding wound on said common pole piece, means for defining a plurality of gaps on opposite sides with each gap defining a separate non-overlapping track along the transverse extent of the record medium and means for individually applying a bias signal of amplitude sufficient to cause operation in said linear portion the gaps defined by the last mentioned means.

5. In combination, a common pole piece having a plurality of magnetic circuits with a multiplicity of magnetic gaps defining separate non-overlapping tracks on opposite sides thereof across the transverse extent of a record medium having a magnetic transfer characteristic with a substantially linear portion, a common signal winding on said common pole piece linking all of said circuits, an individual bias winding on each of said magnetic circuits, and means for applying a bias signal to said individual windings of amplitude sufficient to cause operation in said linear portion in a predetermined sequence whereby a signal to be recorded is distributed along the transverse extent of said record medium as said medium passes thereover.

6. In combination, a common pole piece having a plurality of magnetic circuits with a multiplicity of magnetic gaps defining separate non-overlapping tracks laterally offset on opposite sides thereof across the transverse extent of a record medium, having a magnetic transfer characteristic with a substantially linear portion, a common signal winding wound on said common pole piece linking all of said circuits, means for applying a signal to be recorded to said signal winding, an individual bias winding linked to each of said magnetic circuits, and means for applying a bias signal of amplitude sufficient to cause operation in said linear portion to said individual windings in a predetermined sequence whereby the signal to be recorded is distributed along the transverse extent of said record medium as said medium passes thereover.

7. In combination, a common pole piece having a plurality of magnetic circuits with a multiplicity of magnetic gaps defining separate non-overlapping tracks with said gaps laterally offset on opposite sides thereof across the transverse extent of a record medium, having a magnetic transfer characteristic with a substantially linear portion, a common signal winding on said common pole piece linking all of said circuits, means for applying a signal to be recorded to said signal winding, an individual bias winding on each of the magnetic circuits, and means for applying bias pulses of amplitude sufficient to cause operation in said linear portion to each of said windings to effect recording of said signal.

8. In combination, a magnetic core having a plurality of magnetic circuits on opposite sides thereof across the transverse extent of a record medium, having a magnetic transfer characteristic with a substantially linear portion, a common signal winding linking all of the circuits, an individual bias winding on each of the circuits, means for applying a bias signal of amplitude sufficient to cause operation in said linear portion to each of the bias windings, and means for applying a signal to be recorded to the common signal winding.

9. In combination, a magnetic core having a plurality of magnetic circuits on opposite sides thereof across the transverse extent of a record medium, having a magnetic transfer characteristic with a substantially linear portion, a common signal winding linking all of the circuits, an individual bias winding on each of the circuits, means for applying a signal to be recorded to said common signal winding of an amplitude whereby said signal is not normally recorded, and means for applying a bias signal of amplitude sufficient to cause operation in said linear portion to each of the bias windings to effect recording.

10. In combination, a magnetic core having a plurality of magnetic circuits on opposite sides thereof across the transverse extent of a record medium, having a magnetic transfer characteristic with a substantially linear portion, a common signal winding linking all of the circuits, an individual bias on each of the circuits, means for applying a signal to be recorded of an amplitude whereby said signal is not normally recorded, and means for applying bias pulses of amplitude sufficient to cause operation in said linear portion to each of the bias windings to effect recording.

11. In combination, a magnetic core having a plurality of magnetic circuits across the transverse extent of a record medium, having a magnetic transfer characteristic with a substantially linear portion, a common signal winding linking all of the circuits, an individual bias on each of the circuits, means for applying a signal to be recorded of a low amplitude to said signal winding so that said signal is not normally recorded, and means for applying a bias pulse of amplitude sufficient to cause operation in said linear portion to each of the bias windings to effect recording of said signal.

12. In combination, a common pole piece having a plurality of magnetic circuits across the transverse extent of a record medium, having a magnetic transfer characteristic with a substantially linear portion, a common signal winding on said common pole piece linking all of said circuits, means for applying a signal to be recorded to said signal winding of an amplitude so that said signal is not normally recorded, an individual bias winding linked to each of said magnetic circuits, and means for applying a bias signal of amplitude sufficient to cause operation in said linear portion to said individual windings in a predetermined sequence whereby the signal to be recorded is distributed along the transverse extent of said record medium as said medium passes thereover.

13. In combination, a common pole piece having a plurality of magnetic circuits across the transverse extent of a record medium, having a magnetic transfer characteristic with a substantially linear portion, a common signal winding on said common pole piece linking all of said circuits, means for applying a signal to be recorded to said signal winding of an amplitude such that said signal is not normally recorded, a plurality of individual bias windings connected respectively to each of the magnetic circuits, and means for applying bias pulses of amplitude sufficient to cause operation in said linear portion to each of said windings to effect recording of said signal.

References Cited in the file of this patent

UNITED STATES PATENTS

| | | |
|---|---|---|
| 2,700,588 | Williams et al. | Jan. 25, 1955 |
| 2,848,556 | Roys et al. | Aug. 19, 1958 |
| 2,901,549 | Serrell | Aug. 25, 1959 |

FOREIGN PATENTS

| | | |
|---|---|---|
| 776,401 | Great Britain | June 5, 1957 |

OTHER REFERENCES

Magnetic Materials in the Electrical Industry, Bardell; Macdonald & Co., Ltd., London; pp. 239–242.